(12) United States Patent
Schneider et al.

(10) Patent No.: US 6,863,299 B2
(45) Date of Patent: Mar. 8, 2005

(54) OVERHEAD AIRBAG SYSTEM AND METHOD

(75) Inventors: David W. Schneider, Waterford, MI (US); Christina Morris, Auburn Hills, MI (US)

(73) Assignee: Autoliv ASP, Inc., Ogden, UT (US)

(*) Notice: Subject to any disclaimer, the term of this patent is extended or adjusted under 35 U.S.C. 154(b) by 51 days.

(21) Appl. No.: 10/390,402

(22) Filed: Mar. 17, 2003

(65) Prior Publication Data

US 2004/0183282 A1 Sep. 23, 2004

(51) Int. Cl.$^7$ .......................... B60R 21/22; B60R 21/28
(52) U.S. Cl. ................... 280/730.1; 280/739; 280/740; 280/743.1
(58) Field of Search .............................. 280/730.1, 739, 280/740, 728.2, 743.1, 743.2, 730.2

(56) References Cited

U.S. PATENT DOCUMENTS

| | | | |
|---|---|---|---|
| 5,775,726 A | | 7/1998 | Timothy et al. |
| 5,984,348 A | * | 11/1999 | Specht et al. ............ 280/730.1 |
| 6,123,355 A | | 9/2000 | Sutherland |
| 6,364,350 B2 | * | 4/2002 | Hoagland ................. 280/730.1 |
| 6,616,177 B2 | * | 9/2003 | Thomas et al. ............. 280/729 |
| 2003/0020268 A1 | * | 1/2003 | Reiter et al. ................ 280/742 |

FOREIGN PATENT DOCUMENTS

| | | | | |
|---|---|---|---|---|
| GB | 2339558 A | * | 2/2000 | ........... B60R/21/16 |
| GB | 2 345 669 | | 7/2000 | |

* cited by examiner

Primary Examiner—Peter C. English
(74) Attorney, Agent, or Firm—Sally J. Brown

(57) ABSTRACT

The overhead airbag system includes an inflatable cushion and a fill tube. The inflatable cushion has a first and a second opening. The fill tube has an outlet and two open ends. The fill tube passes through the first and second openings. The outlet is positioned within the inflatable cushion and the two open ends are positioned outside the inflatable cushion. An inflation source is in fluid communication with both the open ends of the fill tube. Upon deployment, the inflation source generates inflation gas that passes through the fill tube and into the inflatable cushion through the outlet. During inflation, the fill tube expands to limit passage of inflation gas between the fill tube and the perimeter of the first and second openings. Following inflation, the fill tube at least partially separates from the perimeter of the first and second openings to enable inflation gas to exit the cushion.

35 Claims, 8 Drawing Sheets

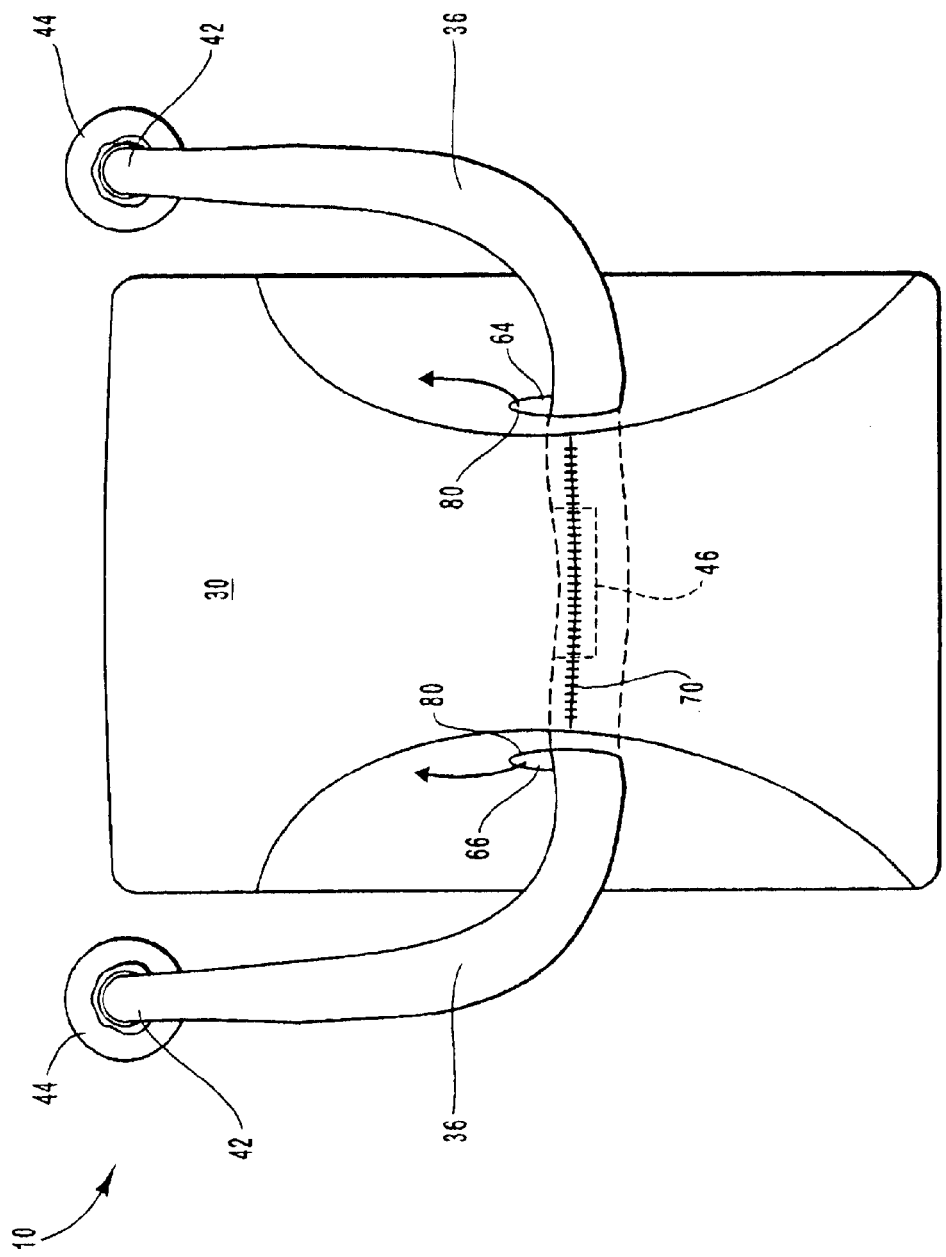

OVERHEAD AIRBAG SYSTEM AND METHOD

BACKGROUND OF THE INVENTION

1. Field of the Invention

The present invention relates to an airbag system designed to protect an occupant of a vehicle during a collision. More specifically, this invention relates to a system and method for protecting an occupant of a vehicle using an overhead airbag system.

2. Description of Related Art

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of a seat belt and an airbag, serious chest injuries in frontal collisions can be reduced by 65% and serious head injuries by up to 75%. Airbag use presents clear benefits and vehicle owners are frequently willing to pay the added expense for airbags. In addition, the inclusion of inflatable safety restraint devices, or airbags, is now a legal requirement for many new vehicles.

Airbag systems typically include three principal components: an electronic control unit (ECU), an inflator, and an inflatable cushion. The ECU monitors the acceleration and deceleration of the vehicle and determines when accident conditions exist. The ECU is in communication with the inflator and transmits a signal to the inflator when the ECU determines that the vehicle has been involved in an accident.

In response to receipt of the signal, the inflator generates inflation gas. The inflator can be designed to produce inflation gas using various methods. For instance, the inflator may use pyrotechnic techniques or simply release compressed gas. In addition, the inflator may use a combination of both pyrotechnics and compressed gas to produce pressurized inflation gas. The inflation gas, in certain embodiments, includes foam. The inflator in is fluid communication with the inflatable cushion.

The inflatable cushion receives the gas generated by the inflator and rapidly expands as the gas fills the cushion. The inflatable cushion is made from a flexible material, such as fabric. When expanded, the cushion receives the energy of an occupant impact and dissipates the energy such that injuries are minimized or completely avoided.

The positioning of the inflated cushion during a crash is critical to proper protection of an occupant. The inflated cushion should be positioned to shield the occupant from impacting hard surfaces within the vehicle, such as the steering wheel, windshield, or dashboard.

The most common type of airbag system stores the cushion and inflator in a compartment in the steering wheel. This type of airbag system is frequently referred to as a driver's side airbag system. When the vehicle is involved in an accident, the ECU, which is generally not situated in the steering wheel, sends a signal to the inflator. The cushion receives the gas generated by the inflator, expands, and is propelled out of the compartment in the steering wheel. The cushion is fully inflated in a fraction of a second. The inflated cushion prevents the driver from striking the steering wheel and dissipates the kinetic energy of the occupant to minimize injury to the occupant. Similar airbag systems are frequently installed in the passenger side of the dashboard. Unfortunately, these types of airbag systems have several disadvantages including poor protection for out-of-position (OOP) occupants and unaesthetic tear seams on the instrument panel or steering wheel.

Overhead airbags systems have been produced in an attempt to provide better protection for out-of-position vehicle occupants and to avoid the necessity of installing airbags in the steering wheel or dashboard of the vehicle. These airbag systems are stored in a compartment in the roof of a vehicle. When accident conditions exist, the cushion deploys down and away from the roof to a position in front of a protected occupant. The cushion prevents the occupant from striking the dashboard or windshield of the vehicle.

Overhead airbag systems may be designed in a variety of different ways. One type of conventional overhead airbag system includes a fill tube that is sewn along the outside, bottom edge of the cushion. The fill tube is in fluid communication with an inflator. Openings in the fill tube and cushion are aligned to allow the inflation gas to move from the fill tube into the cushion.

Unfortunately, this type of airbag system presents a number of disadvantages. First, it is labor intensive, time-consuming, and costly to sew large portions of the fill tube to the cushion. Also, the fill tube, which carries highly pressurized gas, places significant stress on the cushion during inflation. As a result, additional expense must be incurred to reinforce the area of the cushion to which the tube is sewn, or a stronger material must be used to make the cushion. In either case, the cost of manufacturing and assembly are once again increased. Furthermore, cushion stability can become an issue if the part of the fill tube that runs along the bottom of the cushion contacts an occupant's legs during inflation.

Furthermore, it is desirable to permit the cushion to retain inflation gas during inflation of the cushion, but to vent inflation gas in a controlled manner when the occupant impacts the cushion so that the cushion can better absorb the energy of the impact. Unfortunately, many systems for venting the inflation gas increase the cost of manufacturing the airbag system.

As a consequence, it would be an advancement in the art to provide an overhead airbag system that is more cost-effective and simple to manufacture and assemble than conventional airbag systems. It would be a further advancement in the art to provide an airbag system that retains the fill tube in an elevated position during deployment to prevent occupant contact with the fill tube. It would also be advantageous to permit controlled venting of the inflatable cushion during occupant impact in order to better absorb the energy of the impact.

SUMMARY OF THE INVENTION

The apparatus and method of the present invention have been developed in response to the present state of the art, and in particular, in response to problems and needs in the art that have not yet been fully solved by currently available airbag systems. The overhead airbag system resolves these concerns in that it is simple in design and easy to manufacture and assemble. Moreover, the overhead airbag system provides a cost-effective system for venting inflation gas when the occupant impacts the cushion and also maintains the fill tube at an elevated position to minimize the risk of occupant contact with the fill tube.

The overhead airbag system includes an overhead inflatable cushion and a fill tube. The inflatable cushion includes a first lateral side, a second lateral side, a front side, a back side, and a top side. When deployed in a vehicle, the back side of the cushion receives the occupant. The first and second lateral sides of the cushion generally face opposite sides of the vehicle.

The fill tube is used to inflate the cushion. The fill tube defines two open ends. The open ends are in fluid communication with an inflation source, which generates pressurized inflation gas. The inflation source may be a single inflator in fluid communication with both open ends of the fill tube. Alternatively, separate inflators may be in fluid communication with each of the open ends. The inflation source may be directly or indirectly attached to the open ends of the fill tube. A gas guide may be interposed between the inflation source and each of the open ends of the fill tube.

The fill tube passes through the inflatable cushion. More specifically, the cushion defines a first and a second opening through which the fill tube passes. The first and second openings may be positioned at various locations on the cushion. In one embodiment, the openings are both positioned in the top side of the cushion. In another embodiment, the first opening is positioned in the first lateral side of the inflatable cushion, and the second opening is positioned in the second lateral side of the cushion.

The fill tube defines an outlet through which inflation gas moves from the fill tube into the inflatable cushion. The outlet is positioned entirely within the inflatable cushion. The outlet may include an opening that may be of various sizes and shapes through which inflation gas may enter the fill tube. In addition, the outlet may include a plurality of openings, such as a group of circular openings.

As stated above, the fill tube enters the cushion through the first and second openings. In one embodiment, the fill tube is free of attachment to a perimeter of the first and second openings. In another embodiment, only a portion of the perimeter of the first and second openings is attached to the fill tube. The fill tube is also, or alternatively, attached to one of the sides of the cushion, such as the front side. Simple stitching or another type of mechanical fastener, such as a staple, clamp, or rivet, may be used to attach the fill tube to the inflatable cushion.

As stated before, the fill tube may be made from a flexible material, such as fabric. When the inflation source transmits pressurized inflation gas through the fill tube, the fill tube expands and becomes slightly larger than a perimeter of the first and second openings of the cushion. The expanded fill tube at least substantially occludes the first and second openings to limit passage of inflation gas between the fill tube and the perimeter of the first and second openings. This occlusion enables the inflatable cushion to rapidly inflate, without prematurely venting inflation gas.

When the inflation source stops transmission of inflation gas through the fill tube, the fill tube decreases in size. Accordingly, the fill tube at least partially separates from the perimeter of the first and second openings. Inflation gas may then exit the inflatable cushion between the fill tube and the perimeter of the first and second openings. The separation between the fill tube and the perimeter of the first and second openings provides a vent through which inflation gas may exit the inflatable cushion. This vent enables the cushion to better absorb the energy of an occupant striking the cushion.

In view of the foregoing, the overhead airbag system provides substantial advantages over conventional airbag systems. The overhead airbag system is simple in design and easy to manufacture and assemble when compared with conventional airbag systems. Furthermore, the fill tube is retained in an elevated position during deployment to limit occupant contact with the fill tube. Also, a portion of the fill tube is maintained within the cushion, minimizing the likelihood of contact or entanglement with an occupant. The overhead airbag system also provides a system and method for venting the cushion to better dissipate the energy of an occupant impacting the cushion.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which:

FIG. 3b is a front view of the first embodiment of the overhead airbag system following inflation;

DETAILED DESCRIPTION OF THE PREFERRED EMBODIMENTS

The preferred embodiments of the invention are now described with reference to FIGS. 1–6, wherein like parts are designated by like numerals throughout. The members of the present invention, as generally described and illustrated in the Figures, may be designed in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion. The phrase "directly attached to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
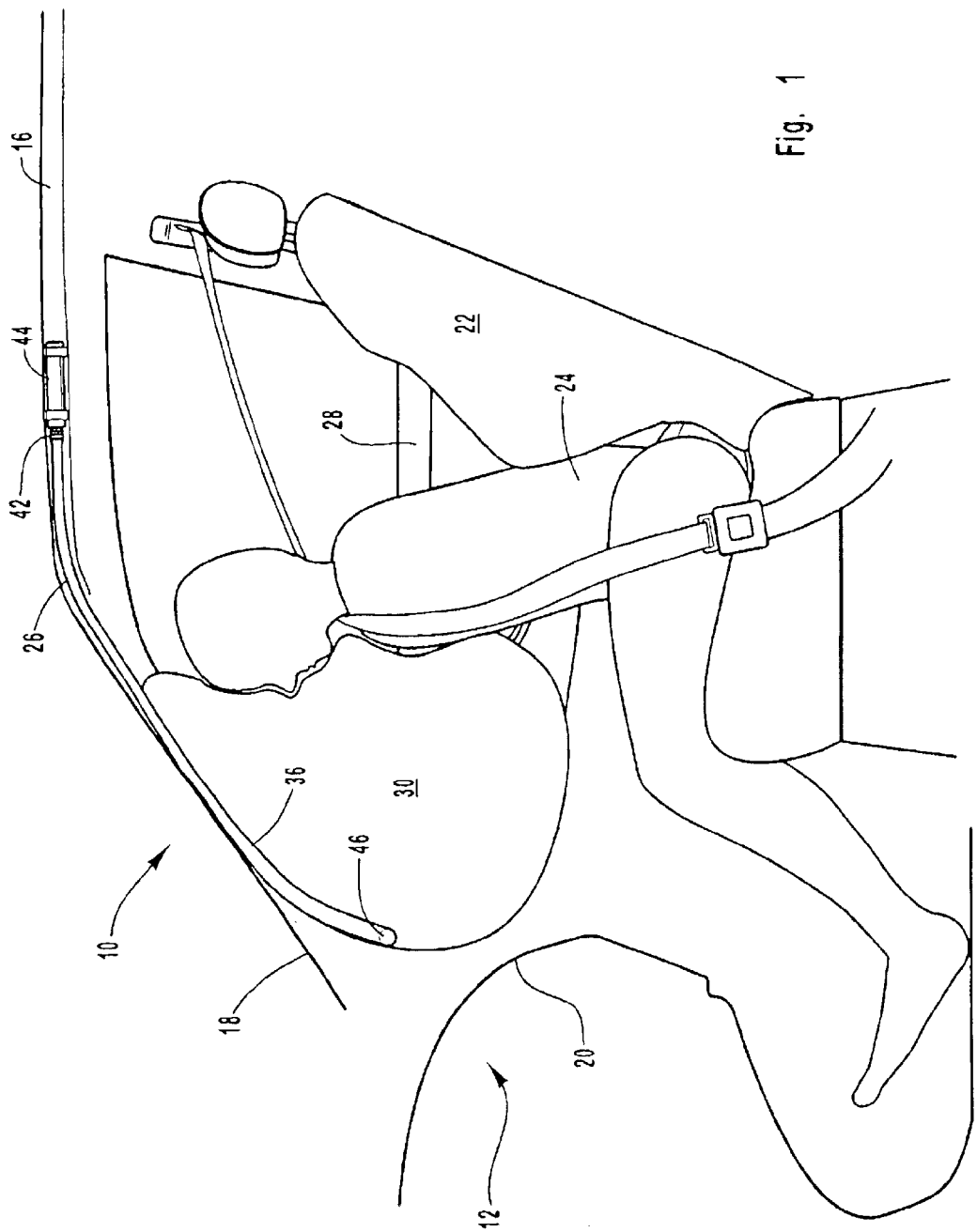
FIG. 1 is a side view of a first embodiment of an overhead airbag system in an inflated state and shown in a vehicle.

With reference to FIG. 1, there is shown a side view of a first embodiment of an overhead airbag system 10 in an inflated state in a vehicle 12. The depicted vehicle 12 includes a roof 16, windshield 18, dashboard 20, and seat 22. An occupant 24 is seated in the passenger side of the vehicle 12. Of course, the overhead airbag system 10 may be used to protect other occupants 24 of a vehicle 12, such as those seated in the driver's side of the vehicle 12 or those in the backseat (not shown) of a vehicle 12.

The depicted airbag system 10 deploys from a compartment 26 in the roof 16 of the vehicle 12. However, the airbag system 10 may also deploy from other locations in the vehicle 12, such as a door 28 of the vehicle 12.

The overhead airbag system 10 includes an overhead inflatable cushion 30 and a fill tube 36. The fill tube 36 passes through the inflatable cushion 30. The fill tube 36 may be made from a flexible material, such as fabric. The inflatable cushion 30 is designed to deploy to a position immediately in front of a protected occupant 24 in the event of an accident. Alternatively, the cushion 30 could deploy to a position between the occupant 24 and a side of the vehicle 12. Of course, in such an embodiment, the cushion 30 would be narrower than the cushion 30 shown in FIG. 1 and may be similar in design to a conventional inflatable curtain.

Figure 2:
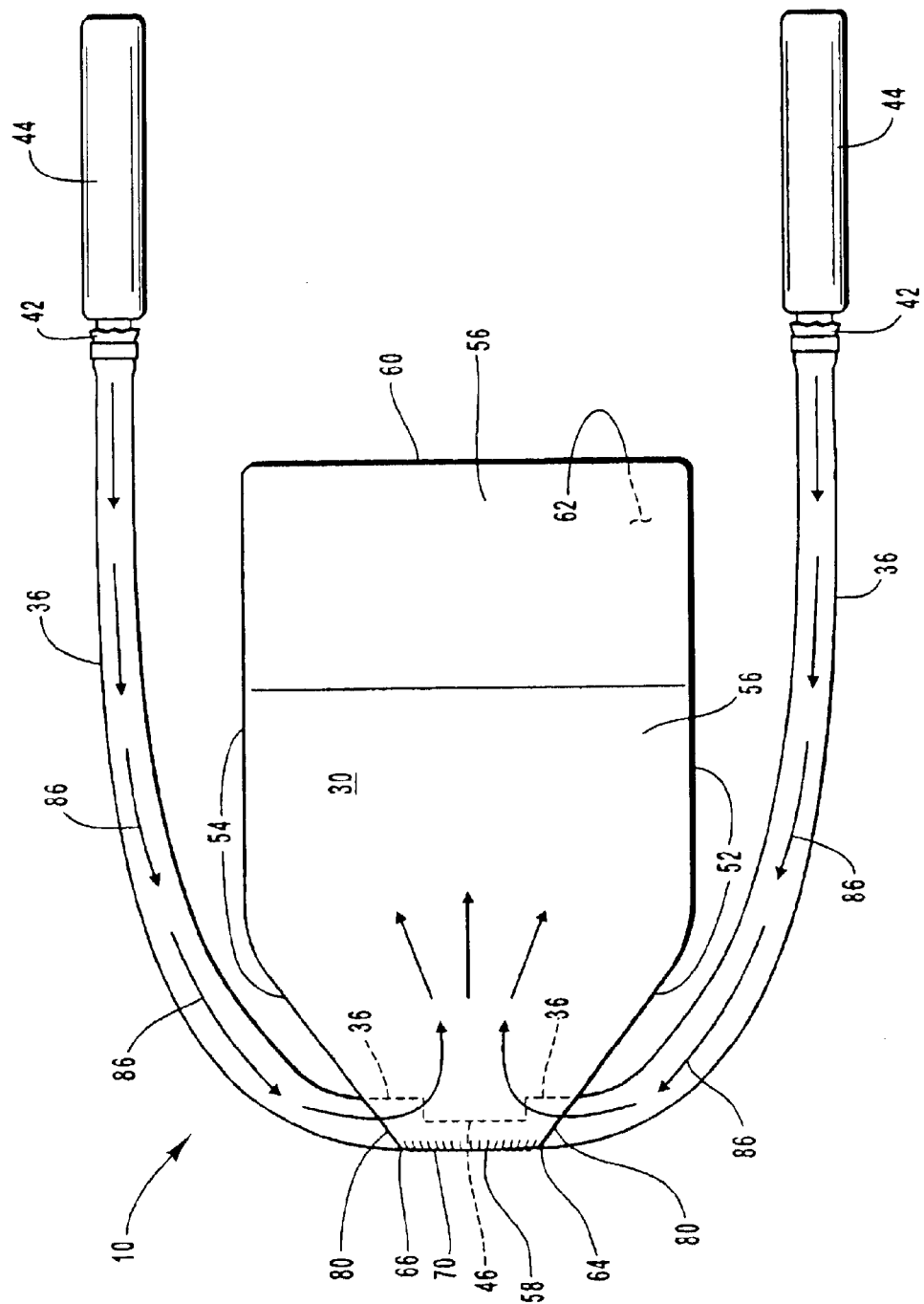
FIG. 2 is a top view of the first embodiment of the overhead airbag system in an inflated state.

The fill tube 36 may include two open ends 42. Only one of the open ends 42 is shown in FIG. 1. Both open ends 42 are depicted in FIGS. 2 and 3. Each open end 42 of the fill tube 36 is in fluid communication with an inflation source 44, which is fastened to the roof 16 of the vehicle 12. The inflation source 44 generates pressurized inflation gas and transmits the gas to the fill tube 36. The term "inflation gas" or "gas," as used in this application, may include a variety of substances used to inflate an inflatable cushion 30. The inflation source 44 may include two inflators. In such an embodiment, each inflator is in fluid communication with one open end 42 of the fill tube 36. Alternatively, a single inflator may be in fluid communication with both of the open ends 42 of the fill tube 36.

The fill tube 36 defines an outlet 46 that permits pressurized inflation gas to move from the fill tube 36 into the inflatable cushion 30. The outlet 46 is an opening in the fill tube 36 and is positioned completely within the inflatable cushion 30.

The overhead airbag system 10 in FIG. 1 is shown in an inflated condition following deployment of the inflatable cushion 30. As stated above, prior to deployment, the inflatable cushion 30 is stored in a compartment 26 in the roof 16 of the vehicle 12. The inflation source 44 is in fluid communication with an electronic control unit, known as an ECU (not shown). When the ECU determines that a crash has occurred, it transmits a signal to the inflation source 44. In response to the signal, the inflation source 44 generates inflation gas. The inflation gas moves into the fill tube 36 and then passes through the outlet 46 into the inflatable cushion 30.

Referring now to FIG. 2, a top view of the first embodiment of the overhead airbag system 10 is shown. Once again, the inflatable cushion 30 is shown in an inflated state. The inflatable cushion 30 includes a first lateral side 52, a second lateral side 54, a top side 56, a front side 58, a back side 60, and an under side 62 (shown in phantom). The first lateral side 52 is generally positioned opposite the second lateral side 54. The first and second lateral sides 52, 54 are generally oriented in a perpendicular direction relative to the back side 60 of the cushion 30. The cushion 30 is oriented relative to a protected occupant 24 (shown in FIG. 1) such that the occupant 24 will strike the back side 60 of the cushion 30 in the event of an accident.

As stated above, the fill tube 36 passes through the inflatable cushion 30. Each open end 42 of the fill tube 36 is in fluid communication with an inflation source 44. As depicted in FIG. 2, the inflation source 44 includes two separate inflators. Each one of the inflators is connected to a different one of the open ends 42. Each of the inflators may be controlled by either the same or a separate electronic control unit. The inflation source 44 may also comprise a single inflator. In such a scenario, the single inflator may be in fluid communication with both of the open ends 42 of the fill tube 36.

The open ends 42 of the fill tube 36 may be connected to the inflation source 44 either directly or indirectly. For example, a gas guide (not shown) may be positioned between the inflation source 44 and each of the open ends 42 of the fill tube 36.

In the first embodiment, a first opening 64 is positioned in the first lateral side 52 of the cushion 30, and a second opening 66 is positioned in the second lateral side 54. The fill tube 36 enters the inflatable cushion 30 through the first and second openings 64, 66.

As illustrated, the fill tube 36 is attached to only the front side 58 of the cushion 30. The fill tube 36 could be attached to alternate locations on the cushion 30, such as the top side 56, the under side 62, the first lateral side 52, or the second lateral side 54 of the cushion 30. Using only a single point of attachment between the cushion 30 and fill tube 36 simplifies the manufacturing and assembly process without a loss of functionality or reliability, as will be explained in greater detail with reference to FIG. 3.

As illustrated, stitching 70 is used to attach the inflatable cushion 30 to the fill tube 36. Of course, other types of mechanical fasteners may be used to achieve this attachment. For example, adhesives, clips, staples, clamps, or rivets may perform a function similar to the depicted stitching 70. In this embodiment, the fill tube 36 is free of attachment to a perimeter 80 of the first and second openings 64, 66 of the cushion 30.

The arrows 86 shown in FIG. 2 illustrate the path of inflation gas. More specifically, upon activation of the inflation source 44, inflation gas moves from the inflation source 44 into each of the open ends 42 of the fill tube 36. The gas then moves through the fill tube 36, exits through the outlet 46 of the fill tube 36, and moves into the inflatable cushion 30.

Figure 3A:
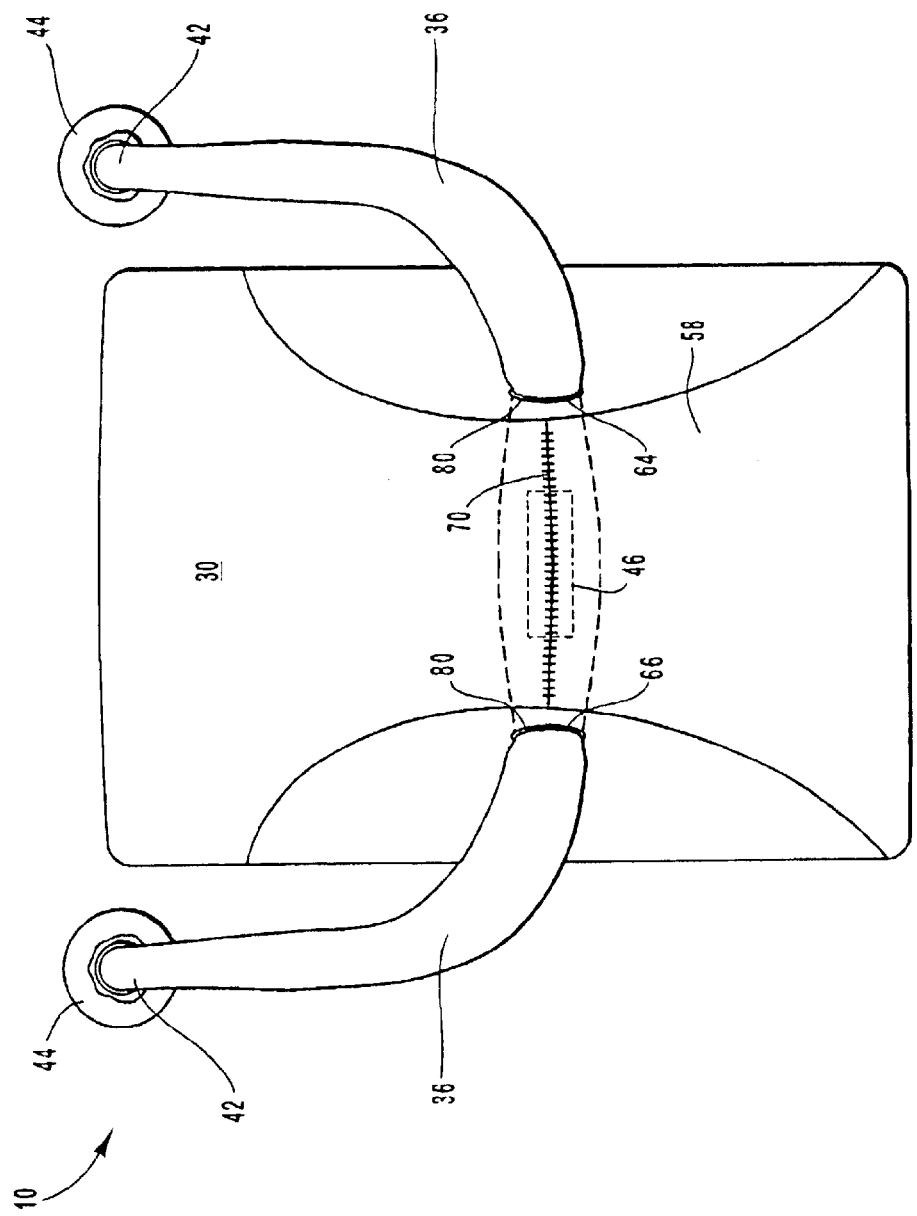
FIG. 3a is a front view of the first embodiment of the overhead airbag system in an inflated state.

FIG. 3a illustrates a front view of the first embodiment of the overhead airbag system 10 in an inflated state. As shown, each of the open ends 42 of the fill tube 36 is connected to an inflation source 44. The outlet 46, through which inflation gas moves from the fill tube 36 into the cushion 30, is clearly shown in FIG. 3a. Of course, the depicted shape of the outlet 46 is not limiting of the scope of this invention. The outlet 46 may also, for example, have a circular, elliptical or square shape. In addition, the outlet 46 may include more than one opening in the fill tube 36. Whatever the design, the outlet 46 is positioned entirely within the cushion 30.

The inflatable cushion 30 depicted in FIG. 3a is fully expanded or nearly fully expanded as a result of the injection of inflation gas into the cushion 30. The front side 58 of the cushion 30 is clearly shown in this Figure. If the cushion 30 is oriented as shown in FIG. 1, the front side 58 of the cushion 30 will generally face the windshield 18 of the vehicle 12.

Stitching 70 is used to attach the fill tube 36 to the front side 58 of the cushion 30. In the embodiment illustrated in FIGS. 1–3, the fill tube 36 is attached to the cushion 30 only along the front side 58 of the cushion 30. The fill tube 36 is free of attachment to a perimeter 80 of the first and second openings 64, 66 of the inflatable cushion 30. As stated above, the fill tube 36 is made from a flexible material. When the inflation source 44 transmits pressurized inflation gas through the fill tube 36, the fill tube 36 expands. The expanded fill tube 36 at least substantially occludes the first and second openings 64, 66 of the cushion 30. Accordingly, the fill tube 36 limits passage of inflation gas between the fill tube 36 and the perimeter 80 of each of the first and second openings 64, 66 of the cushion 30 during inflation of the cushion 30. The fill tube 36 is slightly wider than a perimeter 80 of the first and second openings 64, 66.

The size of the fill tube 36 relative to the perimeter 80 of the first and second openings 64, 66 simplifies the manufacturing and assembly process of the overhead airbag system 10. In particular, it is not necessary to sew, or otherwise attach, the fill tube 36 to the perimeter 80 of the first and second openings 64, 66. Achieving such an attachment could be time consuming, awkward, and may unnecessarily introduce the possibility of error, all of which could increase the cost of manufacturing the overhead airbag system 10.

FIG. 3b illustrates a front view of the first embodiment of the overhead airbag system 10 immediately following inflation. FIG. 3b, just as FIG. 3a, shows the fill tube 36 attached to an inflation source 44. Again, the fill tube 36 passes through the first and second openings 64, 66 of the cushion 30.

Not attaching the fill tube 36 to the perimeter 80 of the first and second openings 64, 66 provides a method of venting the cushion 30 to better absorb the energy of an occupant impact. This process occurs following inflation of the cushion 30. When the inflation source 44 stops transmitting inflation gas through the fill tube 36, the fill tube 36 decreases in size. As a result, the fill tube 36 at least partially separates from the perimeter 80 of the first and second openings 64, 66, as shown in FIG. 3b. Inflation gas may then exit the cushion 30 between the fill tube 36 and the perimeter 80 of the first and second openings 64, 66. Thus, the overhead airbag system 10 includes a system and method for venting the cushion 30 after it is inflated.

Figure 4:
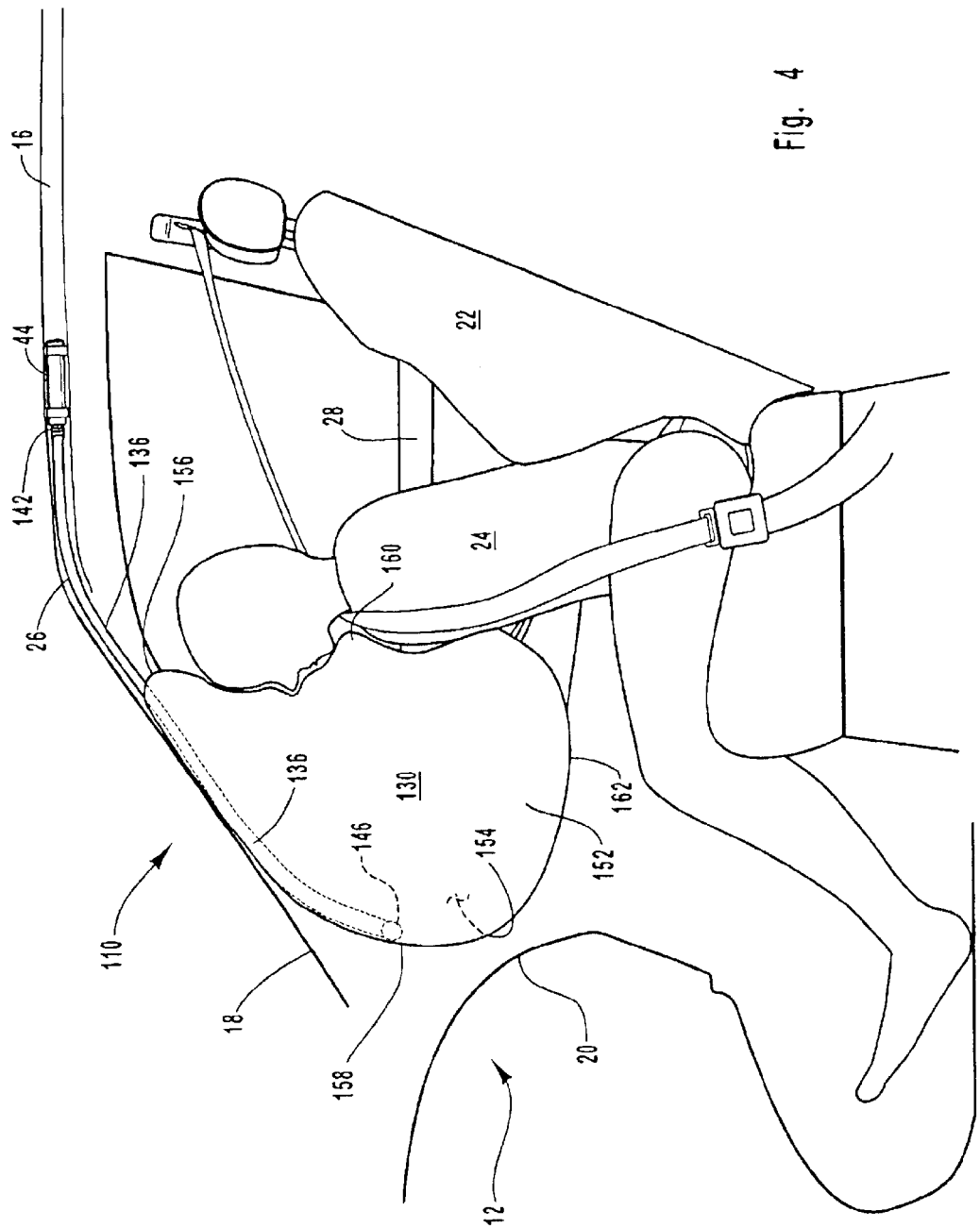
FIG. 4 is a side view of a second embodiment of the overhead airbag system in an inflated state and shown in a vehicle.

Referring to FIG. 4, there is shown a side view of a second embodiment of the overhead airbag system 110 in an inflated state. The overhead airbag system 110 is depicted in a vehicle 12. As stated before, the vehicle includes a roof 16, windshield 18, dashboard 20, and seat 22. In FIG. 4, an occupant 24 is shown seated in the passenger side of the vehicle 12. Like the overhead airbag system 10 of the first embodiment, the system 110 of the second embodiment may be used to protect driver's side occupants 24 or occupants 24 seated in a rear seat (not shown) of the vehicle 12.

The overhead airbag system 110 shown in FIG. 4, deploys from a compartment 26 positioned in the roof 16 of the vehicle 12. The system 110 may deploy from other positions, such as the door 28 of the vehicle.

As in the first embodiment, the second embodiment includes an inflatable cushion 130 and a fill tube 136. The fill tube 136 includes two open ends 142. Only one of the open ends 142 of the fill tube 136 is shown in FIG. 4. Each of the open ends 142 of the fill tube 136 is in fluid communication with an inflation source 44. The inflation source 44 may include either one or two separate inflators in communication with the fill tube 136.

Inflation gas from the inflation source 44 enters both open ends 142 of the fill tube 136 and exits the fill tube 136 into the cushion 130 through an outlet 146 in the fill tube 136. The outlet 146 is an opening in the fill tube 136 positioned entirely within the cushion 130. The outlet 146 may be designed in a number of different shapes and positions within the scope of this invention and may even include a plurality of openings in the fill tube 136.

The inflatable cushion 130 of the overhead airbag system 110 can be fabricated from a number of different materials, which are known to those skilled in the art. The illustrated cushion 130 has a first lateral side 152, a second lateral side 154 (shown in phantom), a top side 156, a front side 158, a back side 160, and an under side 162. Typically, the occupant 24 will impact the back side 160 of the cushion 130 in an accident.

In contrast to the first embodiment, the fill tube 136 of the second embodiment enters the cushion 130 through the top side 156 of the cushion 130, rather than through the first and second lateral sides 152, 154. The fill tube 136 is attached the front side 158 of the cushion 130. As such, a substantial portion of the fill tube 136 is positioned within the inflatable cushion 130. As a result, the likelihood that the fill tube 136 will be damaged by flying debris or contact the occupant 24 during an accident is decreased.

Figure 5:
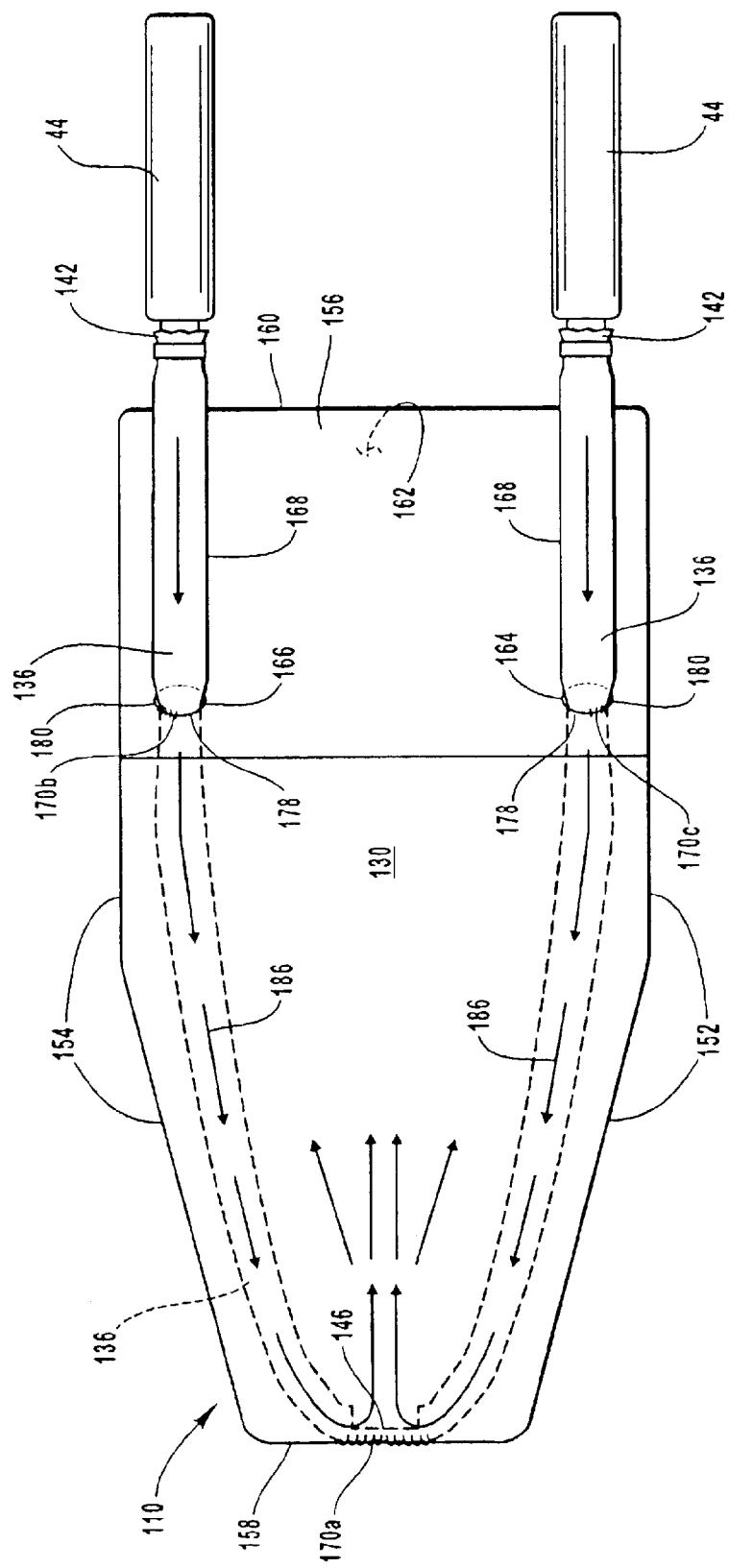
FIG. 5 is a top view of the second embodiment of the overhead airbag system in an inflated state.

FIG. 5 illustrates a top view of the second embodiment of the overhead airbag system 110. The cushion 130 is shown in an inflated condition. Again, the cushion 130 has a first lateral side 152, a second lateral side 154, a top side 156, a front side 158, a back side 160, and an under side 162.

The open ends 142 of the fill tube 136 are each in fluid communication with the inflation source 44. The outlet 146 of the fill tube 136 is positioned entirely within the cushion 130. In this illustrated embodiment, the outlet 146 is oriented such that inflation gas exiting the outlet 146 is generally directed away from the front side 158 of the cushion 130.

In contrast to the first embodiment, a first opening 164 and a second opening 166 are positioned in the top side 156 of the inflatable cushion 130. In this second embodiment, a larger percentage of the fill tube 136 is positioned within the cushion 130 than in the first embodiment, providing superior protection to the fill tube 136 and minimizing the risk that an occupant 24 (shown in FIG. 4) will become entangled with or even contact the fill tube 136. In addition, that part 168 of the fill tube 136 which is outside of the cushion 130 is maintained in an elevated position, further minimizing the risk of contact or entanglement with an occupant 24.

As illustrated in FIG. 5, the front side 158 of the inflatable cushion 130 is attached to the fill tube 136. The fill tube 136 could be attached to alternate locations on the cushion 130, such as the top side 156, the under side 162, the first lateral side 152, or the second lateral side 154. As illustrated, stitching 170a is used to secure the fill tube 136 to the front side 158 of the cushion 130. As with the first embodiment, other types of mechanical fasteners may be used to attach the fill tube 136 to the cushion 130.

In contrast to the first embodiment, a portion 178 of a perimeter 180 of the first and second openings 164, 166 is also attached to the fill tube 136 using stitching 170b–c. Of course, other types of mechanical fasteners may be used to attach the portion 178 of the first and second openings 164, 166 to the fill tube 136. In an alternative embodiment (not illustrated), the fill tube 136 is attached to the cushion 130 only at the portion 178 of the perimeter 180 of the first and second openings 164, 166 and is not otherwise attached to the cushion 130.

The arrows 186 shown in FIG. 5 show the path of inflation gas from the inflation source 44 into the inflatable cushion 130. In particular, inflation gas exits the inflation source 44 and enters both open ends 142 of the fill tube 136. The gas moves through the fill tube 136 and enters the cushion 130 through the outlet 146.

Figure 6A:
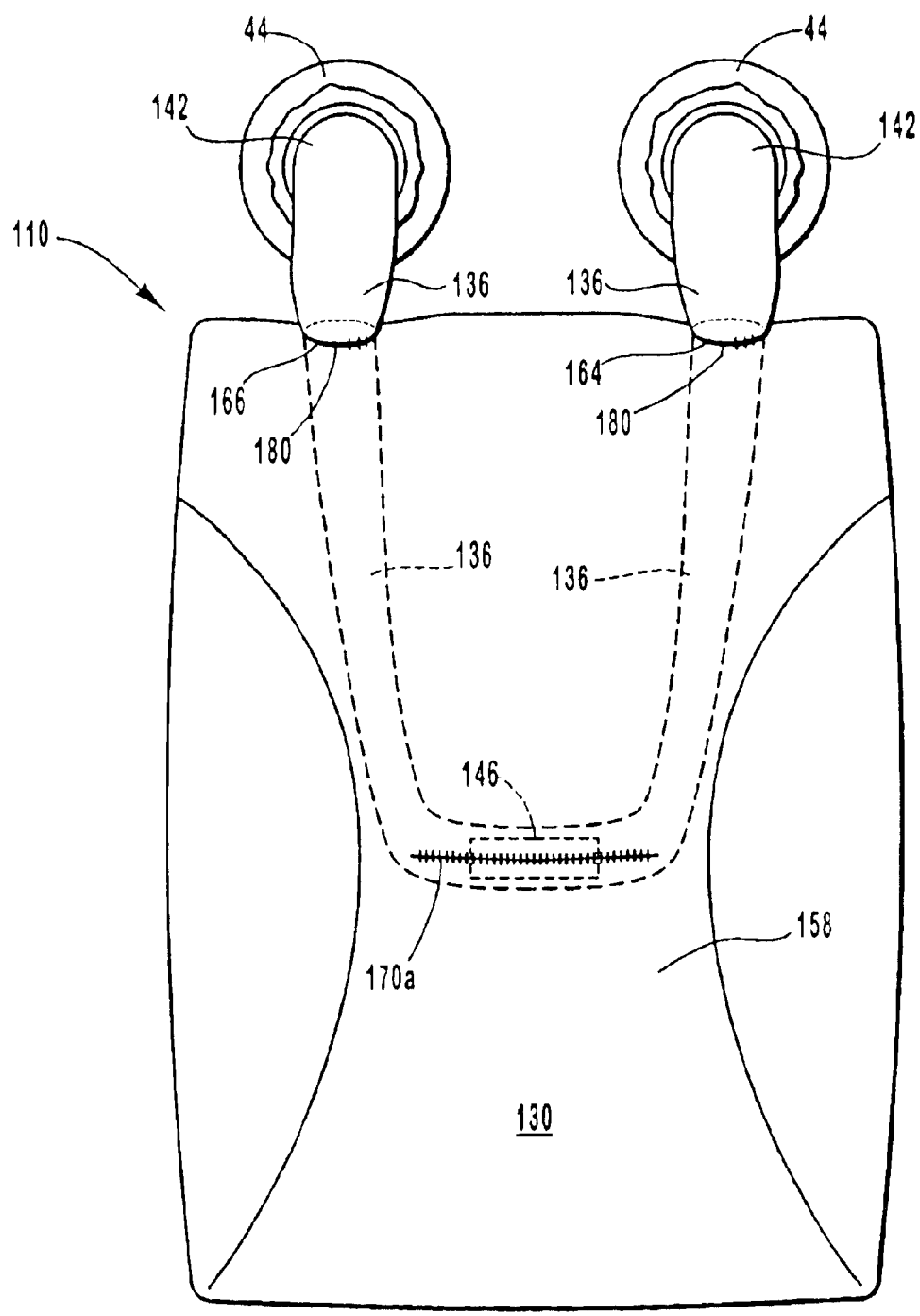
FIG. 6a is a front view of the second embodiment of the overhead airbag system in an inflated state.

With reference to FIG. 6a, a front view of the second embodiment of the overhead airbag system 110 is shown. Once again, the cushion 130 is shown in an inflated condition. The fill tube 136 is attached to the front side 158 of the cushion 130 using stitching 170a. The outlet 146, through which inflation gas moves from the fill tube 136 into the cushion 130, is more clearly shown in this Figure.

Each of the open ends 142 of the fill tube 136 are in fluid communication with the inflation source 44. The inflation source 44 is not necessarily directly connected to the open ends 142. Instead, a gas guide (not shown) may be interposed between each of the open ends 142 of the fill tube 136 and the inflation source 44.

The fill tube 136 enters the cushion 130 through the first and second openings 164, 166. Again, the portion 178 of the perimeter 180 of the first and second openings 164, 166 is attached to the fill tube 136. As illustrated, the inflation source 44 is transmitting inflation gas through the fill tube 136. The fill tube 136 is constructed from a flexible material. As a result, the fill tube 136 expands and becomes wider than a perimeter 180 of the first and second openings 164, 166. Thus, during inflation, the fill tube 136 at least substantially occludes the first and second openings 164, 166, limiting the exit of gas between the fill tube 136 and the perimeter 180 of the first and second openings 164, 166. This occlusion assists in ensuring rapid and proper inflation of the cushion 130. This occlusion occurs although the fill tube 136 is attached to only a portion 178 of the perimeter 180 of the first and second openings 164, 166. This design simplifies the manufacturing and assembly process, resulting in cost savings.

Figure 6B:
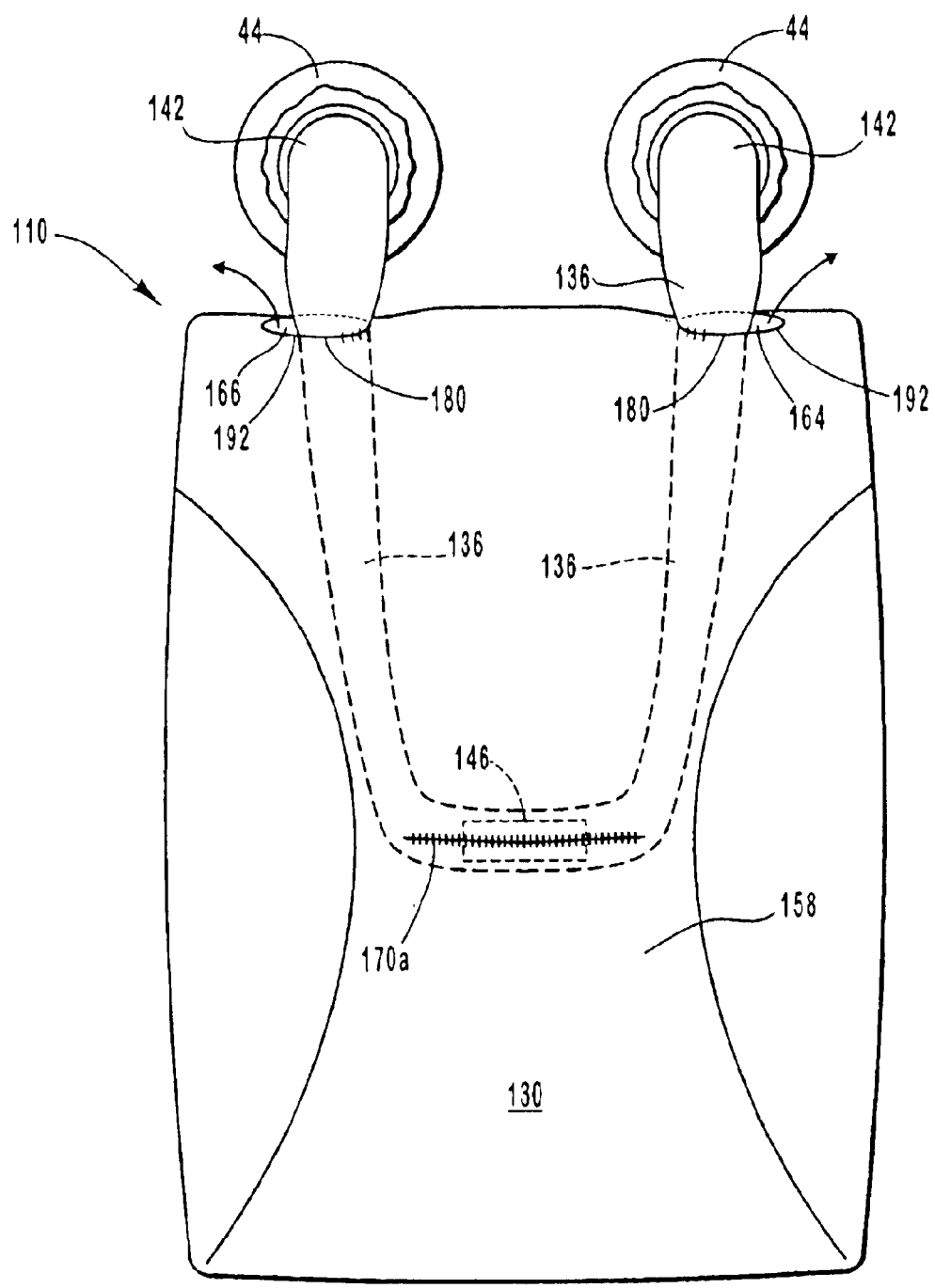
FIG. 6b is a front view of the second embodiment of the overhead airbag system following inflation.

With reference to FIG. 6b, a front view of the second embodiment of the overhead airbag system 110 immediately following inflation is shown. FIG. 6b, just as FIG. 6a, shows the fill tube 136 attached to an inflation source 44. Again, the fill tube 136 passes through the first and second openings 164, 166 of the cushion 130.

When the inflation source 44 stops transmitting inflation gas through the fill tube 136, the fill tube 136 decreases in size. The fill tube 136 separates from the unattached segment 192 of the perimeter 180 of the first and second openings 164, 166, as shown in FIG. 6b. As a consequence, inflation gas may exit between the perimeter 180 of the first and second openings 164, 166 and the fill tube 136, enabling the cushion 130 to better absorb the energy of the occupant 24 (shown in FIG. 4) impacting the cushion 130.

The overhead airbag system provides substantial advantages over conventional airbag systems. The overhead airbag system is simple in design and easy to assemble and manufacture when compared with conventional airbag systems. Furthermore, the fill tube is retained in an elevated position during deployment to prevent occupant contact with the fill tube. Also, a portion of the fill tube is maintained within the cushion, minimizing the likelihood of contact or entanglement with the occupant. The overhead airbag system also permits venting of the cushion following inflation in order to better absorb the energy of an occupant impacting the cushion.

The present invention may be embodied in other specific forms without departing from its structures, methods, or other essential characteristics as broadly described herein and claimed hereinafter. For instance, the first embodiment of the overhead airbag system 10, which is described in FIGS. 1–3, could include a partial attachment between a perimeter 80 of the first and second openings 64, 66 and the fill tube 36. Alternatively, the second embodiment of the overhead airbag system 110 could include a fill tube 136 that is free of attachment to the perimeter 180 of the first and second openings 164, 166 in the cushion 130. Thus, the described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An airbag system comprising:
   an inflatable cushion having a first opening and a second opening; and
   a fill tube having two open ends and an outlet, wherein the fill tube passes through the first and second openings of the inflatable cushion, and wherein the outlet of the fill tube is positioned within the inflatable cushion and the two open ends of the fill tube are positioned outside of the inflatable cushion,
   wherein, during inflation of the inflatable cushion, the fill tube expands and at least substantially occludes the first and second openings to limit passage of inflation gas between the fill tube and the perimeter of the first and second openings, and
   wherein, following inflation of the inflatable cushion, the fill tube at least partially separates from the perimeter of the first and second openings to enable inflation gas to exit the inflatable cushion between the fill tube and the perimeter of the first and second openings.

2. The airbag system of claim 1, wherein the inflatable cushion comprises a first lateral side and a second lateral side, wherein the first lateral side is generally positioned opposite the second lateral side, and wherein the first opening is positioned in the first lateral side and the second opening is positioned in the second lateral side.

3. The airbag system of claim 1, wherein the inflatable cushion comprises a top side, and wherein the first and the second openings are positioned in the top side of the inflatable cushion.

4. The airbag system of claim 1, wherein the inflatable cushion comprises a plurality of sides, and wherein the fill tube is attached to only one of the sides of the inflatable cushion.

5. The airbag system of claim 4, wherein the inflatable cushion comprises a front side, and wherein the fill tube is attached to the inflatable cushion only at the front side of the inflatable cushion.

6. The airbag system of claim 1, wherein the fill tube is made from a flexible material.

7. The airbag system of claim 6, wherein the fill tube is free of attachment to a perimeter of the first and second openings.

8. The airbag system of claim 6, wherein only a portion of a perimeter of the first and second openings is attached to the fill tube.

9. An overhead airbag system comprising:
an overhead inflatable cushion having a first opening and a second opening; and
a fill tube having two open ends and an outlet, wherein the fill tube passes through the first and second openings of the overhead inflatable cushion, and wherein the outlet of the fill tube is positioned within the overhead inflatable cushion and the two open ends of the fill tube are positioned outside of the overhead inflatable cushion, and
wherein, during inflation of the overhead inflatable cushion, the fill tube expands and at least substantially occludes the first and second openings to limit passage of inflation gas between the fill tube and the perimeter of the first and second openings,
wherein, following inflation of the overhead inflatable cushion, the fill tube at least partially separates from the perimeter of the first and second openings to enable inflation gas to exit the overhead inflatable cushion between the fill tube and the perimeter of the first and second openings.

10. The overhead airbag system of claim 9, wherein the overhead inflatable cushion comprises a first lateral side and a second lateral side, wherein the first lateral side is generally positioned opposite the second lateral side, and wherein the first opening is positioned in the first lateral side and the second opening is positioned in the second lateral side.

11. The overhead airbag system of claim 9, wherein the overhead inflatable cushion comprises a top side, and wherein the first and the second openings are positioned in the top side of the overhead inflatable cushion.

12. The overhead airbag system of claim 9, wherein the overhead inflatable cushion comprises a plurality of sides, and wherein the fill tube is attached to only one of the sides of the overhead inflatable cushion.

13. The overhead airbag system of claim 12, wherein the overhead inflatable cushion comprises a front side, and wherein the fill tube is attached to the overhead inflatable cushion only at the front side of the overhead inflatable cushion.

14. The overhead airbag system of claim 9, wherein the fill tube is made from a flexible material.

15. The overhead airbag system of claim 14, wherein the fill tube is free of attachment to a perimeter of the first and second openings.

16. The overhead airbag system of claim 14, wherein only a portion of a perimeter of the first and second openings is attached to the fill tube.

17. An overhead airbag system comprising:
an overhead inflatable cushion having a first opening and a second opening;
a fill tube having two open ends and an outlet, wherein the fill tube passes through the first and second openings of the overhead inflatable cushion, and wherein the outlet of the fill tube is positioned within the overhead inflatable cushion and the two open ends of the fill tube are positioned outside of the overhead inflatable cushion; and
an inflation source in fluid communication with each of the two open ends of the fill tube,
wherein, during inflation of the overhead inflatable cushion, the fill tube expands and at least substantially occludes the first and second openings to limit passage of inflation gas between the fill tube and a perimeter of the first and second openings, and
wherein, following inflation of the overhead inflatable cushion, the fill tube at least partially separates from the perimeter of the first and second openings to enable inflation gas to exit the overhead inflatable cushion between the fill tube and the perimeter of the first and second openings.

18. The overhead airbag system of claim 17, wherein the inflation source comprises a single inflator in fluid communication with both of the two open ends of the fill tube.

19. The overhead airbag system of claim 17, wherein the inflation source comprises two separate inflators, wherein each inflator is in fluid communication with a different one of the two open ends of the fill tube.

20. The overhead airbag system of claim 17, wherein the overhead inflatable cushion comprises a first lateral side and a second lateral side, wherein the first lateral side is generally positioned opposite the second lateral side, and wherein the first opening is positioned in the first lateral side and the second opening is positioned in the second lateral side.

21. The overhead airbag system of claim 17, wherein the overhead inflatable cushion comprises a top side, and wherein the first and the second openings are positioned in the top side of the overhead inflatable cushion.

22. The overhead airbag system of claim 17, wherein the overhead inflatable cushion comprises a plurality of sides, and wherein the fill tube is attached to only one of the sides of the overhead inflatable cushion.

23. The overhead airbag system of claim 22, wherein the overhead inflatable cushion comprises a front side, and wherein the fill tube is attached to the overhead inflatable cushion only at the front side of the overhead inflatable cushion.

24. The overhead airbag system of claim 17, wherein the fill tube is made from a flexible material.

25. The overhead airbag system of claim 24, wherein the fill tube is free of attachment to a perimeter of the first and second openings.

26. The overhead airbag system of claim 24, wherein only a portion of a perimeter of the first and second openings is attached to the fill tube.

27. An overhead airbag system comprising:
a cushion means for cushioning an impact of a vehicle occupant, the cushion means having a first and second opening;
a fill tube means for transmitting inflation gas into the cushion means, the fill tube means having two open ends and an outlet, wherein the fill tube means passes through the first and second openings of the cushion means, and wherein the outlet of the fill tube means is positioned within the cushion means and the two open ends of the fill tube means are positioned outside of the cushion means; and
an inflation means for generating inflation gas, the inflation means being in fluid communication with each of the two open ends of the fill tube means,
wherein, during inflation of the cushion means, the fill tube means expands and at least substantially occludes the first and second openings to limit passage of inflation gas between the fill tube means and a perimeter of the first and second openings, and
wherein, following inflation of the cushion means, the fill tube means at least partially separates from the perimeter of the first and second openings to enable inflation gas to exit the cushion means between the fill tube means and the perimeter of the first and second openings.

28. A method of absorbing energy of an occupant striking an inflatable cushion, comprising:

providing an airbag system having an inflatable cushion having a first opening and a second opening and having a fill tube made from a flexible material having two open ends and an outlet, wherein the fill tube passes through the first and second openings of the inflatable cushion, and wherein the outlet of the fill tube is positioned within the inflatable cushion and the two open ends of the fill tube are positioned outside of the inflatable cushion;

transmitting inflation gas through the fill tube to expand the fill tube and inflatable cushion such that the fill tube expands and at least substantially occludes the first and second openings of the inflatable cushion; and stopping transmission of the inflation gas through the fill tube such that the fill tube decreases in size to permit inflation gas to exit the inflatable cushion between the fill tube and a perimeter of the first and second openings.

29. The method of claim 28, wherein the fill tube is free of attachment to a perimeter of the first and second openings.

30. The method of claim 28, wherein only a portion of a perimeter of the first and second openings is attached to the fill tube.

31. The method of claim 28, wherein the inflatable cushion comprises an overhead inflatable cushion.

32. The method of claim 28, further comprising an inflation source in fluid communication with both open ends of the fill tube.

33. The method of claim 28, wherein the inflatable cushion comprises a first lateral side and a second lateral side, wherein the first lateral side is generally positioned opposite the second lateral side, and wherein the first opening is positioned in the first lateral side and the second opening is positioned in the second lateral side.

34. The method of claim 28, wherein the inflatable cushion comprises a top side, and wherein the first and the second openings are positioned in the top side of the inflatable cushion.

35. The method of claim 28, wherein the inflatable cushion comprises a front side, and wherein the fill tube is attached to the inflatable cushion only at the front side of the inflatable cushion.

* * * * *